United States Patent
Parker et al.

(10) Patent No.: US 12,340,259 B2
(45) Date of Patent: Jun. 24, 2025

(54) THREAD SYNCHRONIZATION ACROSS MEMORY SYNCHRONIZATION DOMAINS

(71) Applicant: NVIDIA CORPORATION, Santa Clara, CA (US)

(72) Inventors: Michael Allen Parker, San Jose, CA (US); Debajit Bhattacharya, San Jose, CA (US); David Fontaine, Mountain View, CA (US); Shirish Gadre, Fremont, CA (US); Wishwesh Anil Gandhi, Sunnyvale, CA (US); Olivier Giroux, Santa Clara, CA (US); Hemayet Hossain, San Jose, CA (US); Ronny M. Krashinsky, San Francisco, CA (US); Ze Long, Santa Clara, CA (US); Raymond Hoi Man Wong, Unionville (CA)

(73) Assignee: NVIDIA CORPORATION, Santa Clara, CA (US)

( * ) Notice: Subject to any disclaimer, the term of this patent is extended or adjusted under 35 U.S.C. 154(b) by 820 days.

(21) Appl. No.: 17/380,424

(22) Filed: Jul. 20, 2021

(65) Prior Publication Data
US 2023/0021678 A1   Jan. 26, 2023

(51) Int. Cl.
*G06F 9/46* (2006.01)
*G06F 9/30* (2018.01)
*G06F 9/38* (2018.01)
*G06F 9/52* (2006.01)

(52) U.S. Cl.
CPC .......... *G06F 9/522* (2013.01); *G06F 9/30087* (2013.01); *G06F 9/3851* (2013.01); *G06F 9/3888* (2023.08)

(58) Field of Classification Search
CPC ..... G06F 9/522; G06F 9/30087; G06F 9/3888; G06F 9/3851
See application file for complete search history.

(56) References Cited

U.S. PATENT DOCUMENTS

| | | | |
|---|---|---|---|
| 2012/0198214 A1* | 8/2012 | Gadre | G06F 9/3851 712/225 |
| 2018/0307529 A1* | 10/2018 | Koker | G06F 9/4881 |
| 2020/0349053 A1* | 11/2020 | Myers | G06F 16/2365 |
| 2021/0026568 A1* | 1/2021 | Swaine | G06F 3/0604 |

OTHER PUBLICATIONS

Derek R. Hower et al., Heterogeneous-race-free Memory Models, ASPLOS'14, Mar. 1-5, 2014, 14 pages.

* cited by examiner

*Primary Examiner* — Tammy E Lee
(74) *Attorney, Agent, or Firm* — Squire Patton Boggs LLP; Sarah Mirza

(57) ABSTRACT

Various embodiments include a parallel processing computer system that provides multiple memory synchronization domains in a single parallel processor to reduce unneeded synchronization operations. During execution, one execution kernel may synchronize with one or more other execution kernels by processing outstanding memory references. The parallel processor tracks memory references for each domain to each portion of local and remote memory. During synchronization, the processor synchronizes the memory references for a specific domain while refraining from synchronizing memory references for other domains. As a result, synchronization operations between kernels complete in a reduced amount of time relative to prior approaches.

20 Claims, 7 Drawing Sheets

THREAD SYNCHRONIZATION ACROSS MEMORY SYNCHRONIZATION DOMAINS

BACKGROUND

Field of the Various Embodiments

Various embodiments relate generally to parallel processing compute architectures and, more specifically, to thread synchronization across memory synchronization domains.

Description of the Related Art

A computing system, referred to herein as a node, generally includes, among other things, one or more processing units, such as central processing units (CPUs) and/or graphics processing units (CPUs), and one or more memory systems. The GPU is capable of executing a large number (e.g., hundreds or thousands) of threads concurrently, where each thread is an instance of a program. In order to simplify certain aspects of programming the GPU from the perspective of the CPU, modern GPU systems provide a transitive synchronization property, also referred to herein as a cumulative synchronization property. With this property, one thread can generate memory references, such as loads and stores of memory values, visible to other threads executing on the GPU and/or to other threads executing on other GPUs. This synchronization is accomplished when a thread executes a memory fence instruction, also referred to herein as a memory barrier or MEMBAR instruction. Additionally or alternatively, MEMBAR instructions may be executed by a unit that distributes tasks or other work for the threads. The MEMBAR instruction specifies the scope of the synchronization, such as GPU scope or system scope. A GPU scope MEMBAR instruction (MEMBAR.GL) ensures that prior memory references performed by a thread are visible to other clients within the GPU. A system scope MEMBAR instruction (MEMBAR.SYS) ensures that prior memory references performed by a thread are visible to other clients within the node.

For example, if one thread (thread A) communicates or synchronizes to a second (thread B) which subsequently synchronizes with a third (thread C), then the thread C has transitively synchronized with thread A and should have visibility to values properly synchronized between thread A and thread B even if those threads are not all in the same scope in the scope hierarchy. In a multi-GPU system, if threads A and B execute on one GPU and thread C executes on another GPU, thread A may store values to any memory aperture, such as local memory, system memory, peer-to-peer memory. Thread A may synchronize with thread B by executing a MEMBAR.GL instruction and then storing a flag A. Once flag A is stored, the memory references for by thread A are visible to other threads in the GPU. After observing flag A, thread B may synchronize with thread C by executing a MEMBAR.SYS and then storing a flag B. Because thread B first synchronized with thread A via the MEMBAR.GL instruction and then executed a MEMBAR.SYS instruction, the MEMBAR.SYS instruction causes all memory references for both thread A and thread B, as well as all other threads in the GPU, to be visible to thread C. As a result, all threads in the GPU are synchronized at the system scope, whether or not these other threads need to synchronize with other GPUs and/or the CPU. The GPU does not know, a priori, which memory references are associated with each thread. Therefore, the GPU hardware synchronizes at the system scope by conservatively flushing memory references from all threads to be visible at the system level.

One drawback to this approach for synchronizing threads is that threads that do not need to synchronize at the system level may nevertheless be forced to do so when any thread executes a MEMBAR.SYS instruction. Synchronizing threads within a GPU via local memory (GPU scope) generally consumes less time and interconnect bandwidth than synchronizing threads executing in different GPUs via system memory (system scope). When thread B executes MEMBAR.SYS instruction, a fourth thread D, which may be unrelated to the intended system scope synchronization, nevertheless is forced to synchronize at the system scope. This forced synchronization of thread D causes unrelated memory traffic that needlessly slows down, or interferes with, the MEMBAR.SYS executed by thread B to synchronize with thread C. Because of this interference inefficiency, the MEMBAR.SYS instruction executed by thread B reduces the performance of thread B, and may also reduce the performance of thread D, by synchronizing threads unnecessarily.

As the foregoing illustrates, what is needed in the art are more effective techniques for synchronizing threads executing on a processor.

SUMMARY

Various embodiments of the present disclosure set forth a computer-implemented method for synchronizing threads executing in a processor. The method includes determining that a first thread has executed a first memory barrier instruction, wherein the first thread is included in a first set of threads associated with a first domain. The method further includes determining a set of memory apertures that have been accessed by at least one thread included in the first set of threads. The method further includes generating a memory barrier command that includes references to the set of memory apertures and excludes references to other memory apertures accessed by threads associated with a second domain. The method further includes transmitting the memory barrier command to the set of memory apertures.

Other embodiments include, without limitation, a system that implements one or more aspects of the disclosed techniques, and one or more computer readable media including instructions for performing one or more aspects of the disclosed techniques, as well as a method for performing one or more aspects of the disclosed techniques.

At least one technical advantage of the disclosed techniques relative to the prior art is that, with the disclosed techniques, only the memory apertures referenced by threads in a particular domain are synchronized during the processing of a MEMBAR instruction. Memory apertures referenced only by other domains are not synchronized. Therefore, the threads for the particular domain do not wait unnecessarily for synchronization of memory apertures that have been accessed only by other domains. As a result, MEMBAR instructions complete in a reduced amount of time relative to prior approaches. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
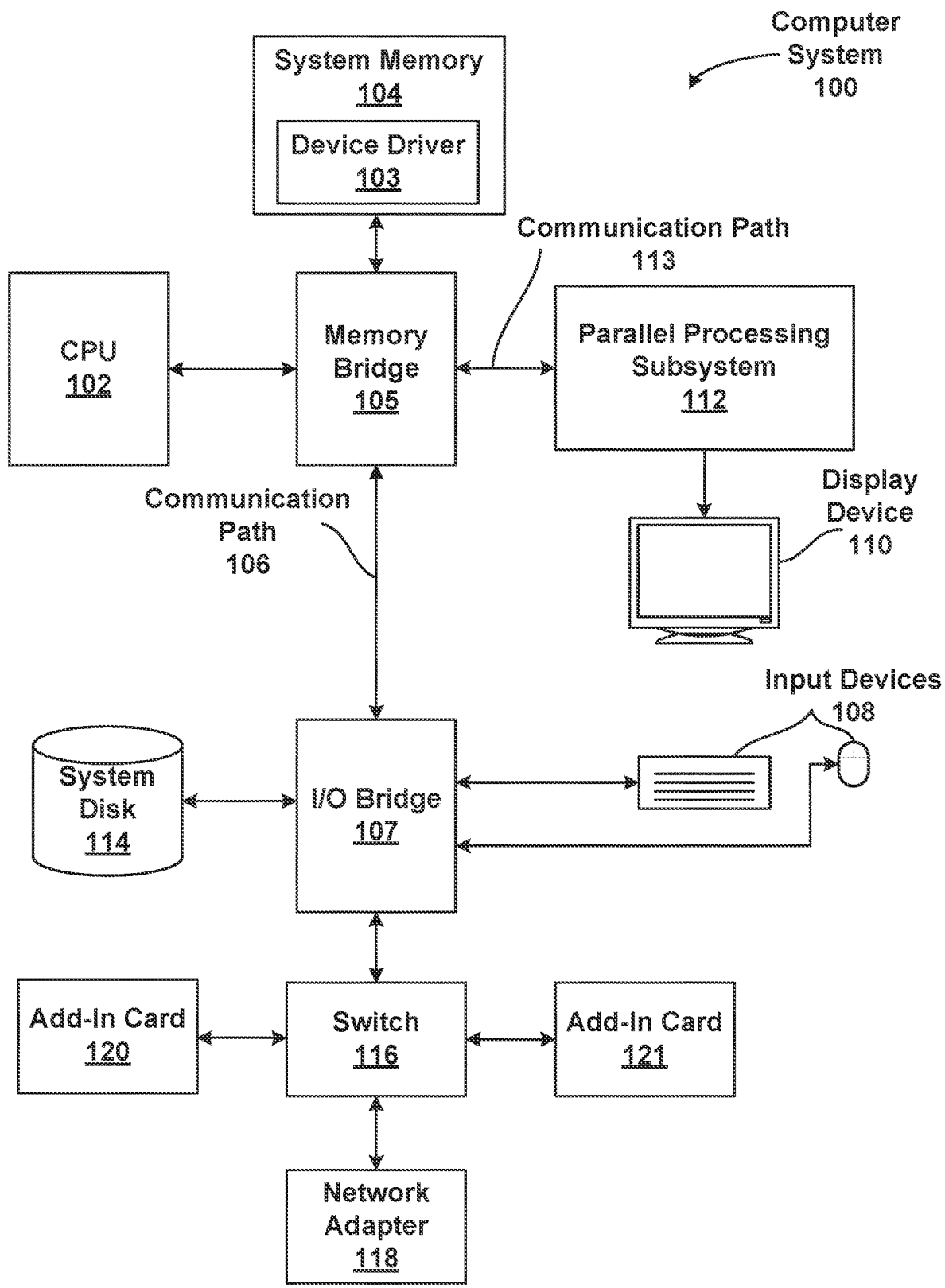
FIG. 1 is a block diagram of a computer system configured to implement one or more aspects of the various embodiments.

FIG. 1 is a block diagram of a computer system 100 configured to implement one or more aspects of the various embodiments. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
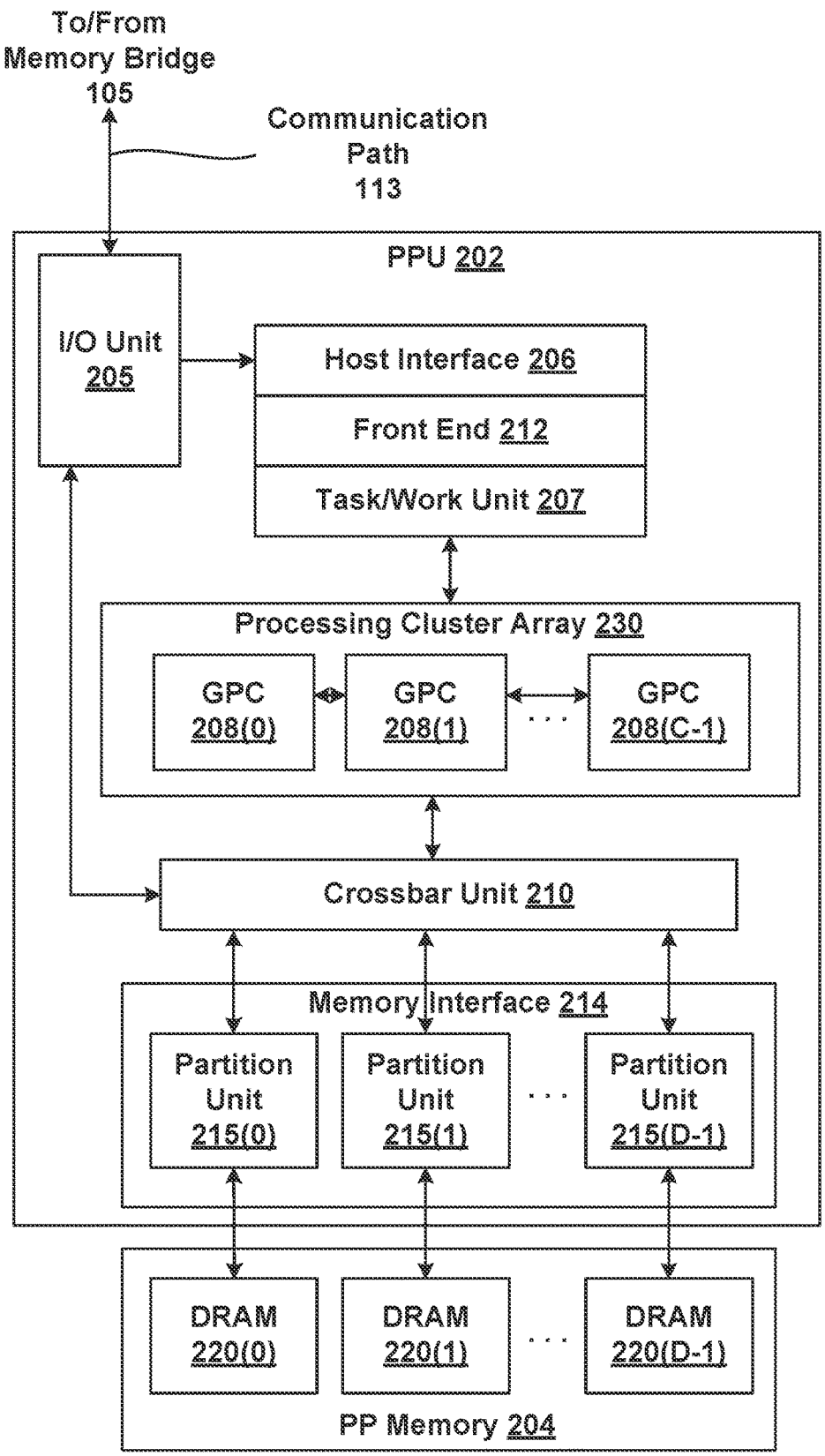
FIG. 2 is a block diagram of a parallel processing unit (PPU) included in the parallel processing subsystem of FIG. 1, according to various embodiments.

FIG. 2 is a block diagram of a parallel processing unit (PPU) 202 included in the parallel processing subsystem 112 of FIG. 1, according to various embodiments. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D 1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity, and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
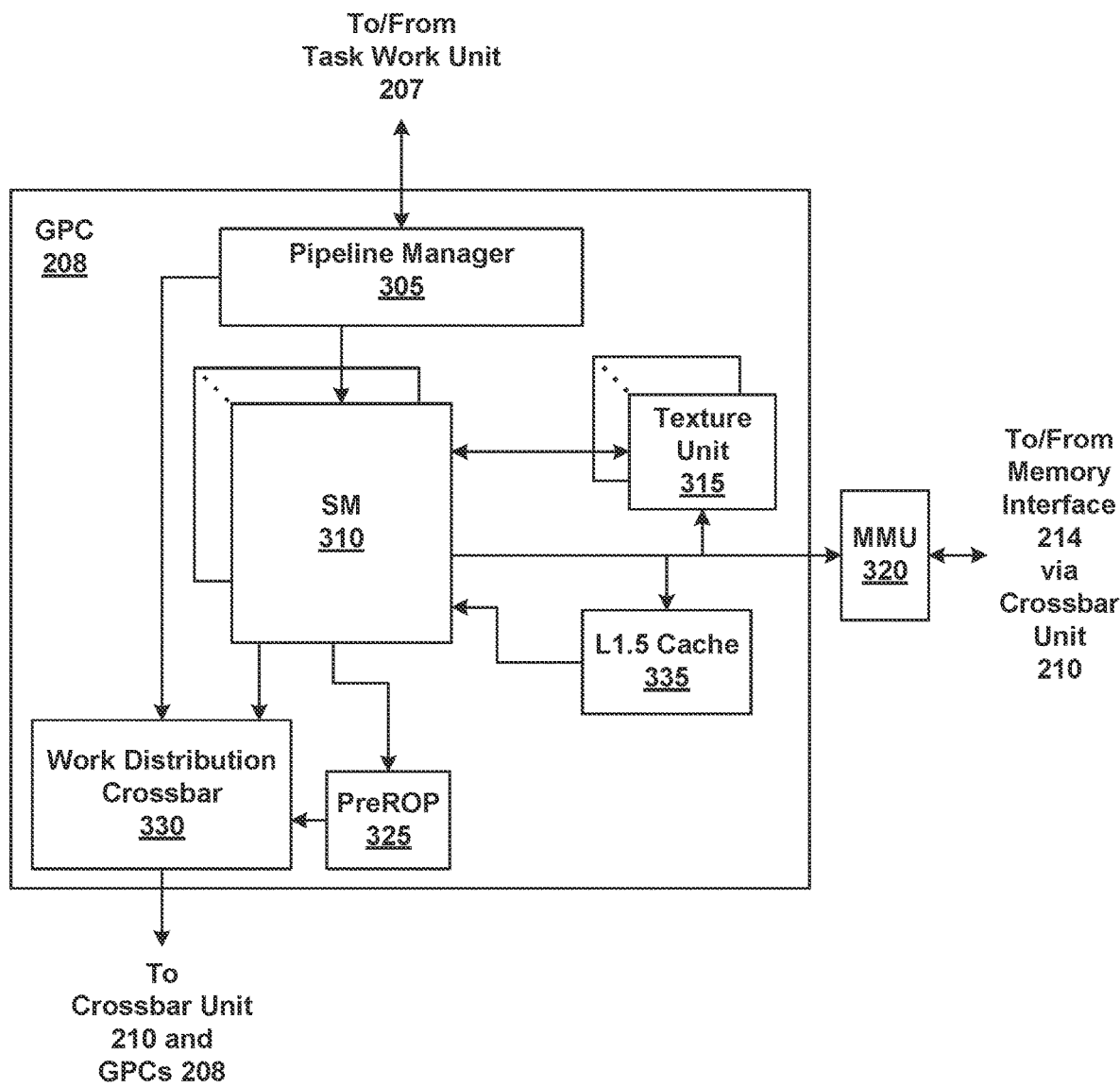
FIG. 3 is a block diagram of a general processing cluster (GPC) included in the parallel processing unit (PPU) of FIG. 2, according to various embodiments.

FIG. 3 is a block diagram of a general processing cluster (GPC) 208 included in the parallel processing unit (PPU) 202 of FIG. 2, according to various embodiments. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (e.g., AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In various embodiments, a software application written in the compute unified device architecture (CUDA) programming language describes the behavior and operation of threads executing on GPC 208, including any of the above-described behaviors and operations. A given processing task may be specified in a CUDA program such that the SM 310 may be configured to perform and/or manage general-purpose compute operations.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the various embodiments of the present disclosure.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Thread Synchronization Across Memory Synchronization Domains

As described herein, PPUs 202 in a parallel processing subsystem 112 execute kernels in the context of a set of memory synchronization domains, where a kernel is a program executing on an SM 310 by one or more threads, one or more warps, and/or one or more CTAs. Each domain does not represent a physical separation of a portion of the resources of a PPU 202. Rather, a memory synchronization domain represents a set of resources within a PPU 202 that synchronize with one another, but do not necessarily need to synchronize with other resources within the PPU 202 that are not in the memory synchronization domain. These memory synchronization domains within the PPU 202 allow user level program code to specify to the PPU 202 the memory references, such as loads and stores of memory values, that are flushed for a particular memory synchronization domain when a kernel executes a MEMBAR.SYS instruction. When a particular kernel is launched in an SM 310, the kernel and the threads executing within the kernel are tagged with a particular domain identifier (ID).

When a thread executing within a kernel tagged as part of the memory synchronization domain with a domain ID of 3 executes a MEMBAR.SYS instruction, the PPU 202 flushes memory references to system scope for only those kernels executing with a domain ID of 3. Memory references for kernels executing with other domain IDs, such as a domain ID of 2, are not flushed to system scope. As a result, the kernels executing with a domain ID of 3 are not slowed down by unnecessary flushes to system scope of memory references associated with kernels executing with other domain IDs.

To support these techniques, each SM 310 tracks memory references on a per memory synchronization domain basis. For each memory synchronization domain, the SM 310 tracks memory references to each external memory aperture. In that regard, each SM 310 tracks memory references directed towards the system memory 104 for subsequent access by one or more CPUs 102 within the node. Further, each SM 310 tracks memory references directed towards peer memory for subsequent access by one or more other PPUs 102 within the node. In addition, each SM 310 tracks memory references directed towards peer memory for subsequent access by the network adapter 118 to communicate with network adapter 118 within other nodes. In some embodiments, each SM 310 may track memory references directed towards local memory, such as memory references directed towards the L2 cache and/or towards the DRAM 220 via the memory interface 214. In some embodiments, the MMUs 320 track memory references rather than the SMs 310. Additionally or alternatively, both the SMs 310 and the MMUs 320 track memory references.

In some embodiments, the SMs 310 and/or the MMUs 320 may track memory references to a set of memory apertures that includes a first memory aperture that is external to the SM 310 and a second memory aperture that is external to the SM 310 and exclusive of the first memory aperture. For example, the SMs 310 and/or the MMUs 320 may track multiple distinct external memory apertures, such as an external memory aperture in system memory 104 and an external memory aperture in peer memory, an external memory aperture for a first peer in peer memory and an external memory aperture for a second peer in peer memory, and/or the like.

In some embodiments, the SMs 310 and/or the MMUs 320 may track memory references to a set of memory apertures that includes two subsets of memory apertures, where the two subsets of memory apertures are not identical to one another. Each of the two subsets of memory apertures may include memory apertures that are internal to the SM 310 and/or memory apertures that are external to the SM 310. The two subsets of memory apertures may be different from one another but may have one or more memory apertures in common. The two subsets of memory apertures may be different from one another and have no memory apertures in common. Each of two subsets of memory apertures may include one memory aperture, two memory apertures, three memory apertures, or any technically feasible number of memory apertures. Further, the set of memory apertures may be divided into two subsets of memory apertures, three subsets of memory apertures, or any technically feasible number of subsets of memory apertures.

In a first example, a first SM 310 may access an internal memory aperture in PP memory 204 and an external memory aperture in peer memory. A second SM 310 may access an internal memory aperture in PP memory 204 that is shared with the first SM 310 and an external memory aperture in system memory 104. In a second example, a first SM 310 may access an internal memory aperture in PP memory 204 and an external memory aperture to peer 2 in peer memory. A second SM 310 may access an external memory aperture to peer 2 in peer memory that is shared with the first SM 310 and an external memory aperture in system memory 104. In a third example, a first SM 310 may access an internal memory aperture in PP memory 204 and an external memory aperture to a peer in peer memory. A second SM 310 may access an external memory aperture in system memory 104. In a fourth example, a first SM 310 may access an internal memory aperture in PP memory 204 and an external memory aperture to peer 3 in peer memory. A second SM 310 may access an external memory aperture to peer 7 in peer memory and an external memory aperture in system memory 104. In a fifth example, a first SM 310 may access an internal memory aperture in PP memory 204, an external memory aperture in system memory 104, and an external memory aperture to peer 0 in peer memory. A second SM 310 may access an internal memory aperture in PP memory 204 that is shared with the first SM 310, an external memory aperture to peer 1 in peer memory, and an external memory aperture to peer 2 in peer memory. And so on.

When one or more threads within a particular kernel execute a MEMBAR.GL instruction, the corresponding SM 310 communicates the MEMBAR.GL instruction to the MMU 320 along with the domain ID of the kernel and the list of memory apertures that the threads within that memory synchronization domain have referenced. The memory apertures include system memory 104 associated with the CPUs 102, peer memory associated with other PPUs 202, peer memory associated with the network adapter 118, and local memory, such as the L2 cache and/or the DRAM 220. The memory apertures for only the affected domain are synchronized at GPU scope.

When one or more threads within a particular kernel execute a MEMBAR.SYS instruction, the corresponding SM 310 communicates the MEMBAR.SYS instruction to the MMU 320 along with the domain ID of the kernel and the list of memory apertures that the threads within that memory synchronization domain have referenced. When processing a MEMBAR.SYS instruction, if none of the threads in the affected domains have referenced any system memory aperture or peer memory aperture, then the MMU 320 does not synchronize the system memory apertures or peer memory apertures at system scope. Likewise, if the threads in the affected domains have referenced only a subset of the memory apertures, then only the subset of domains is synchronized at the scope specified by the MEMBAR instruction.

Figure 4:
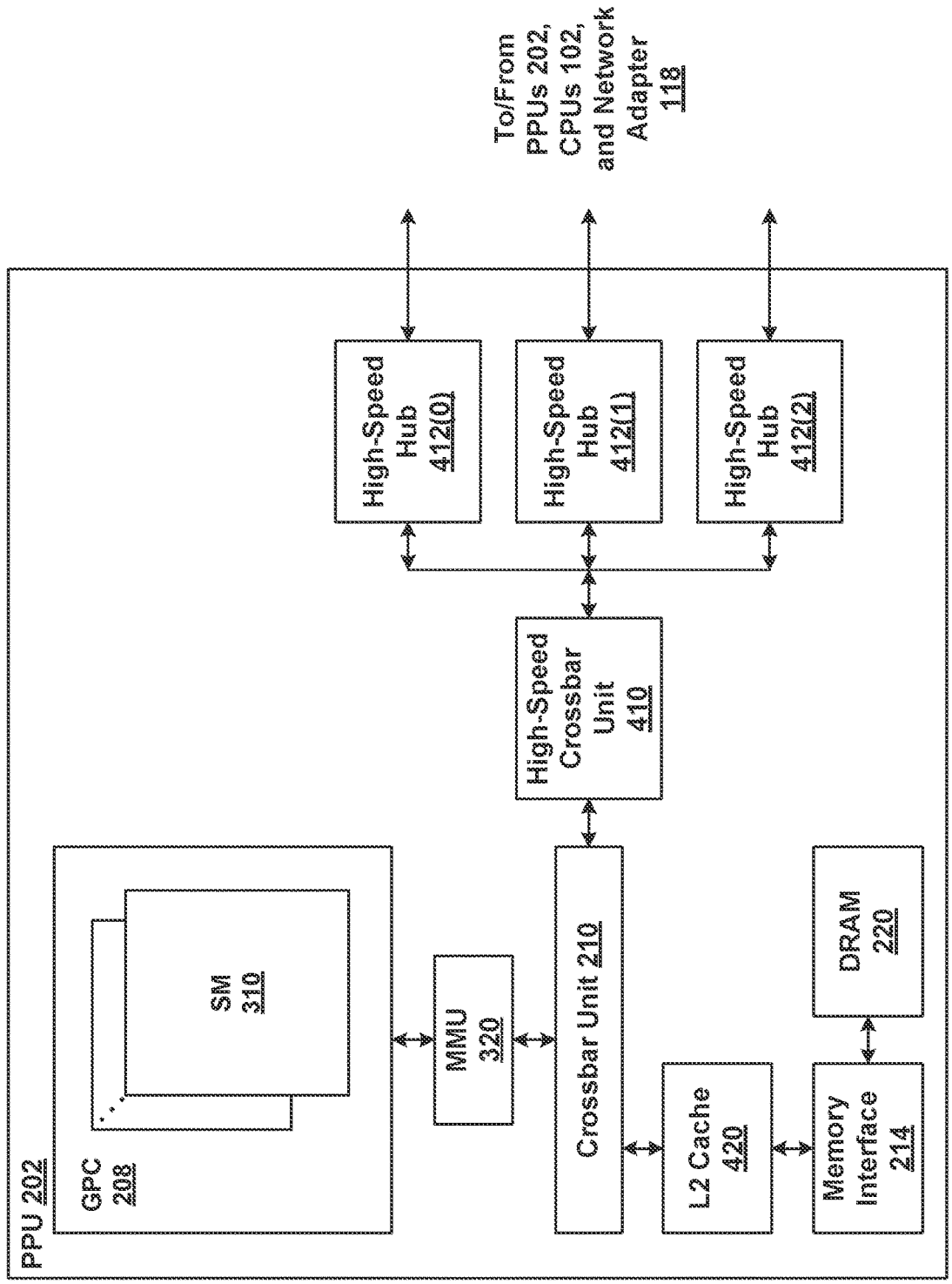
FIG. 4 is a block diagram of the memory synchronization domain system included in the PPU of FIG. 2, according to various embodiments.

FIG. 4 is a block diagram of the memory synchronization domain system included in the PPU 202 of FIG. 2, according to various embodiments. As shown, a PPU 202 includes one or more GPCs 208, and each GPC 208 includes multiple SMs 310. The PPU 202 further includes an MMU 320, a crossbar unit 210, a level 2 (L2) cache 420, a memory interface 214, DRAM 220, a high-speed crossbar unit 410, and multiple high-speed hubs 412(0), 412(1), and 412(2).

As further described herein, processing tasks, also referred to herein as kernels, are identified by and associated with specific memory synchronization domains. The software programmer determines a priori which kernels are included in each domain. Commands related to kernels are directed towards the host interface 206 (not shown in FIG. 4). Processing tasks are identified by a domain identifier (ID) that specifies the domain associated with the kernel. The host interface 206 reads each pushbuffer associated with the kernel and transmits the command stream, including the domain ID, stored in the pushbuffer to the front end 212 (not shown in FIG. 4). The front end 212 transmits kernels, including the domain ID, received from the host interface 206 to a work distribution unit within task/work unit 207 (not shown in FIG. 4). The work distribution unit receives pointers to processing tasks that are encoded as task metadata (TMD) and stored in memory. This TMD includes the domain ID received by the work distribution unit from the host interface 206 via the front end 212.

In this manner, kernels executed by the SMs 310 in the GPC 208 are associated with a particular memory synchronization domain. In some embodiments, the domain ID is an encoded bit field that identifies the memory synchronization domain. For example, if the PPU 202 supports up to four memory synchronization domains, then the set of domain IDs would be 0b00 (for domain 0), 0b01 (for domain 1), 0b10 (for domain 2), and 0b11 (for domain 3). Whenever a load/store unit in an SM 310 performs a memory reference, the load/store unit appends the domain ID of the executing kernel when issuing the memory reference to the MMU 320.

The MMU 320 performs a virtual address to physical address translation and determines the memory aperture towards which the memory reference is directed. The memory reference may be directed towards a local memory aperture, such as the DRAM 220 or the L2 cache 420. Alternatively, the memory reference may be directed towards a remote memory aperture, such as another PPU 202 within the node, a CPU 102 within the node, or to another node via the network adapter 118. If the memory reference is directed towards the L2 cache 420, then the MMU 320 transmits the memory reference to the L2 cache 420 via the crossbar unit 210. The L2 cache 420 may, in turn, access corresponding data stored in the DRAM 220 via the memory interface 214. The L2 cache 420 may populate a cache line internal to the L2 cache 420 with the corresponding data stored in the DRAM 220. Subsequently, the L2 cache may evict the cache line in favor of newer data stored in the DRAM 220. When evicting the cache line that has been modified, the L2 cache 420 access the DRAM 220 via the memory interface. The L2 cache stores the modified cache line at the appropriate address in the DRAM 220.

If the memory reference is directed towards a remote memory aperture, then the MMU 320 transmits the memory reference to one of the high-speed hubs 412(0)-412(2) via the high-speed crossbar unit 410. The memory reference is forwarded by the respective high-speed hubs 412(0)-412(2) to the remote peer. The remote peer may be system memory 104 accessed by one or more CPUs 102 within the node, peer memory accessed by one or more additional PPUs 202 within the node, and/or memory on the network adapter 118 to transmit to another node.

The PPU 202 includes memory reference trackers (not shown) that track memory references directed towards each memory aperture and for each domain. The memory apertures include DRAM 220, the L2 cache 420, each CPU 102 included in the node, each of the other PPUs 202 included in the node, and the network adapter 118. In some embodiments, the memory reference trackers may be distributed throughout the PPU 202. The MMU 320, and associated memory reference tracker, tracks memory references involving the CPUs 102 and the network adapter 118 as a single memory aperture. In addition, a framebuffer hub (not shown) within the I/O unit 205 of FIG. 2 tracks memory references involving the different CPUs 102 and the network adapter. The L2 cache 420 and the DRAM 220 share a single memory reference tracker. The L2 cache 420 serves as a cache of the DRAM 220. In addition, the L2 cache 420 serves as a cache for memory included in one or more other PPUs 202 included in the parallel processing subsystem 112. In such cases, peer memory reference trackers and/other PPU 202 memory reference trackers track memory references involving the one or more other PPUs 202 and/or associated CPU 102 memory.

In one example, if a memory reference is directed towards DRAM 220 for domain 0, then the memory reference tracker records that a DRAM 220 memory reference has occurred for domain 0. Likewise, if a memory reference is directed towards the L2 cache 420 for domain 1, then the memory reference tracker records that an L2 cache 420 memory reference has occurred for domain 1. Similarly, if a memory reference is directed towards a remote peer for domain 2, then the memory reference tracker records that a memory reference has occurred for a particular CPU 102, PPU 202, or network adapter 118 for domain 2. In this manner, the number of memory references issued to each memory aperture are tracked for each domain.

The PPU 202 intrinsically ensures transitivity within a domain but not between domains. Therefore, kernels executing within each domain execute MEMBAR.GL and MEMBAR.SYS instructions as needed to preserve transitivity between domains and between PPUs 202. When a thread executing on a kernel in a particular domain executes a MEMBAR instruction, the SM transmits the MEMBAR instruction, along with the domain ID, to the MMU 320. The MMU 320 accesses the corresponding tracker for that domain to determine the set of memory apertures accessed by that domain since the prior MEMBAR instruction was executed. The MMU 320 generates a MEMBAR command packet or, more simply, a MEMBAR command, that identifies the domain ID and the set of memory apertures accessed by that domain. If no memory apertures have been accessed by the domain, then the MEMBAR command completes. Otherwise, the MMU 320 transmits the MEMBAR command to each memory aperture accessed by that domain.

Each memory aperture that receives the MEMBAR command determines whether that memory aperture has any outstanding memory references. If the memory aperture does not have any outstanding memory references, then the memory aperture returns an acknowledgement to the MMU 320 that the MEMBAR command is complete for that memory aperture. If, on the other hand, the memory aperture does have one or more outstanding memory references, then the memory aperture waits until all outstanding memory references have reached an appropriate serialization point.

In some embodiments, each memory aperture may have more than one serialization point. In such embodiments, a first serialization point corresponds to synchronization within the same PPU 202 (GPU scope), and a second serialization point corresponds to synchronization with another PPU 202, CPU 102, and/or the like (system scope). The first serialization point and the second serialization point may be in the same location. For example, the serialization point for memory references directed towards the L2 cache 420 is the same as the serialization point for memory references directed towards the DRAM 220 for both GPU scope MEMBAR instructions and system scope MEMBAR instructions. Alternatively, the first serialization point and the second serialization point may be in different locations. For example, the high-speed hubs 412 serve as GPU scope serialization points for memory references directed towards peer memory that resides on another PPU 202. However, the L2 cache 420 serves as the system scope serialization point for those same memory references to towards peer memory that resides on another PPU 202. As a result, a MEMBAR.GL instruction issued by a kernel on a source PPU 202 waits for memory references to reach a serialization point in the high-speed hub 412 of the source PPU. By contrast, a MEMBAR.SYS instruction issued by the same kernel at that same point waits for those same memory references to reach the L2 cache 420 serialization point in the destination PPU 202.

Once all outstanding memory references have reached a serialization point, the memory aperture returns an acknowledgement to the MMU 320 that the MEMBAR command is complete for that memory aperture. After the MMU 320 receives an acknowledgement from all the relevant memory apertures, the MMU 320 clears the tracker for the relevant memory apertures for the domain associated with the MEMBAR command. In this fashion, the MEMBAR command flushes only the relevant memory apertures accessed by the domain and does not flush memory apertures that have only been accessed by other domains.

In some embodiments, the MMU 320 may generate a MEMBAR command for multiple domains. When the MMU 320 receives a MEMBAR instruction, the MMU 320 waits for a duration of time to determine if the MMU 320 receives one or more additional MEMBAR instructions. If the MMU 320 does not receive any other MEMBAR instructions within the duration of time, then the MMU 320 processes the MEMBAR instruction for the domain, as described above. If the MMU 320 receives one or more additional MEMBAR instructions within the duration of time, then the MMU 320 coalesces or otherwise combines the multiple MEMBAR instructions into a single MEMBAR command. The MMU 320 accesses the corresponding trackers for the domains associated with the multiple MEMBAR commands to determine the set of memory apertures accessed by the domains. The MMU 320 generates a MEMBAR command that identifies the domain IDs and the set of memory apertures accessed by the domains. If no memory apertures have been accessed by any of the relevant domains, then the MEMBAR command completes. Otherwise, the MMU 320 transmits the MEMBAR command to each memory aperture accessed by one or more of the relevant domains.

Each memory aperture that receives the MEMBAR command determines whether that memory aperture has any outstanding memory references. If the memory aperture does not have any outstanding memory references, then the memory aperture returns an acknowledgement to the MMU 320 that the MEMBAR command is complete for that memory aperture. If, on the other hand, the memory aperture does have one or more outstanding memory references, then the memory aperture waits until all outstanding memory references have reached a serialization point.

Once all outstanding memory references have reached a serialization point, the memory aperture returns an acknowledgement to the MMU 320 that the MEMBAR command is complete for that memory aperture. After the MMU 320 receives an acknowledgement from all the relevant memory apertures, the MMU 320 clears the tracker for the relevant memory apertures for the domains associated with the MEMBAR command. In this fashion, the MEMBAR command flushes only the relevant memory apertures accessed by the relevant domains and does not flush memory apertures that have only been accessed by other domains.

Threads within a kernel execute a MEMBAR.GL instruction or a MEMBAR.SYS instruction depending on whether the kernel is synchronizing to other kernels in the same domain, kernels in a different domain, or kernels executing on a different PPU 202, the CPU 102, and/or other device.

If, for example, a thread within a kernel performs a number of memory references and then executes a MEMBAR.GL instruction, then the SM 310 stalls for that thread, a warp that includes the thread, or a CTA that includes the thread. The thread, warp, or CTA remains stalled until the completion of the MEMBAR command generated from the MEMBAR instruction by the MMU 320. The MEMBAR.GL command completes when all relevant outstanding memory references have reached a synchronization point within the PPU 202.

Completion of the MEMBAR.GL command does not guarantee that all prior memory references have completed, but rather that prior memory references have reached a serialization point. Once prior memory references have reached a serialization point, subsequent memory references now issued by another thread are ordered in the queue after the memory references associated with the MEMBAR.GL command. This process ensures proper ordering of memory references.

The MEMBAR.GL command does not guarantee that outstanding memory references have reached a remote memory aperture, such as system memory 104 accessed by one or more CPUs 102 within the node, peer memory accessed by one or more additional PPUs 202 within the node, and/or memory on the network adapter 118 to transmit to another node. For example, a thread may execute a store memory reference to an L2 cache 420 on a remote PPU 202, where the store memory reference is transmitted via the high-speed hub 412(0). The thread executes a MEMBAR.GL instruction, and then executes another store memory reference to the L2 cache 420 on the remote PPU 202, where the store memory reference is transmitted via the high-speed hub 412(2). The MEMBAR.GL command may complete when the first store memory reference reaches the high-speed hub 412(0) but has not yet reached the L2 cache 420 on the remote PPU 202. The second store memory reference to the L2 cache 420 on the remote PPU 202 may reach the L2 cache 420 on the remote PPU 202 before the first store memory reference, resulting in out of order memory references on the remote PPU 202. As a result, a memory reference from the same PPU 202 does not process memory references out of order, whereas the remote PPU 202 may process the memory references out of order.

Therefore, threads synchronizing with other threads executing in the remote CPU 102, PPU 202, and/or other network adapter 118 do so by executing a MEMBAR.SYS instruction to ensure that memory references to remote memory apertures have reached the remote CPU 102, PPU 202, and/or network adapter 118, and thus seen as ordered by the remote CPU 102, PPU 202, network adapter 118, and/or other device in the parallel processing subsystem 112. Further, because the PPU 202 provides transitivity within a domain but not between domains, threads communication with kernels executing in a different domain on the same PPU 202 execute a MEMBAR.SYS instruction to ensure that memory references to remote memory apertures have reached the remote CPU 102, PPU 202, and/or network adapter 118. As a result, transitivity is preserved across domains as well as within domains.

In some embodiments, when a kernel completes execution, the PPU 202 may execute a MEMBAR instruction for the kernel to synchronize any outstanding memory references for that kernel. If the kernel is within one domain and does not directly communicate with kernels within other domains and/or kernels executing on remote PPUs 202, then the PPU 202 may execute a MEMBAR.GL instruction to synchronize any outstanding memory references for that kernel at GPU scope. If, however, the kernel directly communicates with kernels within other domains and/or kernels executing on remote PPUs 202, then the PPU 202 may execute a MEMBAR.SYS instruction to synchronize any outstanding memory references for that kernel at system scope.

It will be appreciated that the system shown herein is illustrative and that variations and modifications are possible. The described techniques involve memory synchronization domains at the GPU scope and at the system scope. In addition, these techniques may be deployed at thread scope, warp scope, and/or CTA scope, as well as GPU scope and system scope, in any technically feasible combination. The described techniques involve a PPU 202 with four memory synchronization domains. However, these techniques may be deployed in a PPU 202 with any number of memory synchronization domains. The described techniques are in the context of a set of memory apertures that include DRAM 220, the L2 cache 420, one or more CPUs 102, one or more additional PPUs 202, and a network adapter 118. However, these techniques may be deployed in a PPU 202 with any number and/or type of memory apertures.

Figure 5:
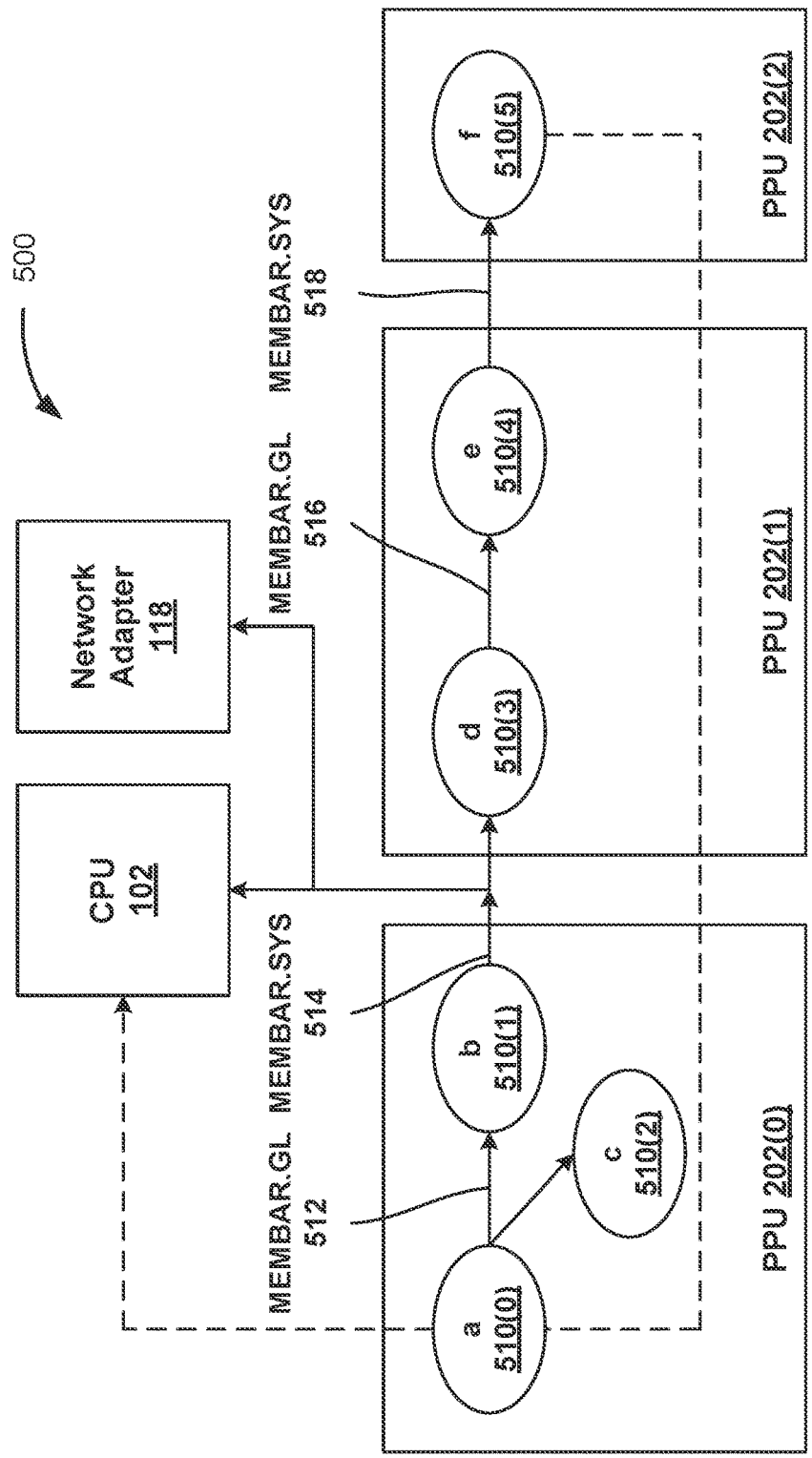
FIG. 5 is a block diagram of a node with multiple parallel processing subsystems, according to various embodiments.

FIG. 5 is a block diagram of a node 500 with multiple parallel processing subsystems 112, according to various embodiments. As shown, the node 500 includes, without limitation, a CPU 102, a network adapter 118, and three PPUs 202(0)-202(2). Kernel a 510(0) executes and performs various memory references during execution. In order to communicate with kernel b 510(1) and/or kernel c 510(2), kernel a 510(0) executes a MEMBAR instruction. Because kernel a 510(0), kernel b 510(1) and/or kernel c 510(2) are all executing on the same PPU 202(0), kernel a 510(0) executes a MEMBAR.GL instruction 512, where the MEMBAR.GL instruction 512 is a memory fence instruction at GPU scope. After the MEMBAR.GL instruction 512 completes, kernel a 510(0), kernel b 510(1), and kernel c 510(2) are referred to herein as "synchronized at GPU scope" and may exchange data.

In one example, kernel a 510(0) could execute various store operations to write certain data values to memory. Then, kernel a 510(0) could issue a MEMBAR.GL instruction 512, which completes once those prior store operations are visible to other threads on the same PPU 202. Kernel a 510(0) would then signal, typically by writing to a designated flag, to kernel b 510(1) and/or kernel c 510(2) that the values corresponding to the prior store operations are "visible" or "synchronized." Therefore, if kernel b 510(1) and/or kernel c 510(2) subsequently read those values, for examples, kernel b 510(1) and/or kernel c 510(2) access the updated values.

In some embodiments, kernel b 510(1) and/or kernel c 510(2) may not yet be executing at the time kernel a 510(0) executes the MEMBAR.GL instruction 512. Even so, the memory values stored by kernel a 510(0) prior to the MEMBAR.GL instruction 512 are ordered such that the values are updated in memory before kernel a 510(0) signals by writing to the designated flag. In particular, kernel b 510(1) and/or kernel c 510(2) may be executing at the time that kernel a 510(0) executes the MEMBAR.GL instruction 512 or may begin execution sometime after kernel a 510(0) executes the MEMBAR.GL instruction 512. In either case, when kernel b 510(1) and/or kernel c 510(2) detect that kernel a 510(0) has signaled by writing to the designated flag. As a result, kernel b 510(1) and/or kernel c 510(2) access the correct memory values stored by kernel a 510(0) prior to the MEMBAR.GL instruction 512.

In some embodiments, synchronization is not symmetric between kernels. For example, kernel a 510(0) may communicate with kernel b 510(1) and/or kernel c 510(2) that values stored by kernel a 510(0) prior to the MEMBAR.GL instruction 512 are now visible or synchronized. As a result, kernel b 510(1) and/or kernel c 510(2) are now able to access the visible or synchronized values stored by kernel a 510(0). However, in such embodiments, kernel b 510(1) would not be able to communicate back to kernel a 510(0) or to kernel c 510(2) without first executing a MEMBAR instruction in order to perform a memory fence and synchronization operation. Likewise, in such embodiments, kernel c 510(2) would not be able to communicate back to kernel a 510(0) or to kernel b 510(1) without first executing a MEMBAR instruction in order to perform a memory fence and synchronization operation.

In order to communicate with kernel d 510(3), the CPU 102 and/or the network adapter 118, kernel b 510(1) executes a MEMBAR instruction. Because kernel d 510(3), the CPU 102, and the network adapter are remote to kernel b 510(1), kernel b 510(1) executes a MEMBAR.SYS instruction 514, where the MEMBAR.SYS instruction 514 is a memory fence instruction at system scope. After the MEMBAR.SYS instruction 514 completes, kernel b 510(1), kernel d 510(3), the CPU 102, and the network adapter 118 are referred to herein as "synchronized at system scope" and may exchange data. Due to transitivity, kernel a 510(0) is also synchronized to the CPU 102 and the network adapter 118 at system scope and may exchange data.

In order to communicate with kernel e 510(4), kernel d 510(3) executes a MEMBAR instruction. Because kernel d 510(3) and kernel e 510(4) are executing on the same PPU 202(0), kernel d 510(3) executes a MEMBAR.GL instruction 516. After the MEMBAR.GL instruction 516 completes, kernel d 510(3) and kernel e 510(4) are synchronized at GPU scope and may exchange data. In order to communicate with kernel f 510(5), kernel e 510(4) executes a MEMBAR instruction. Because kernel f 510(5), executing on PPU 202(2), is remote to kernel e 510(4), kernel e 510(4) executes a MEMBAR.SYS instruction 518. After the MEMBAR.SYS instruction 516 completes, kernel e 510(4) and kernel f 510(5) are synchronized at system scope and may exchange data. Due to transitivity, kernel a 510(0) is also synchronized to kernel f 510(5) at system scope and may exchange data.

Figure 6:
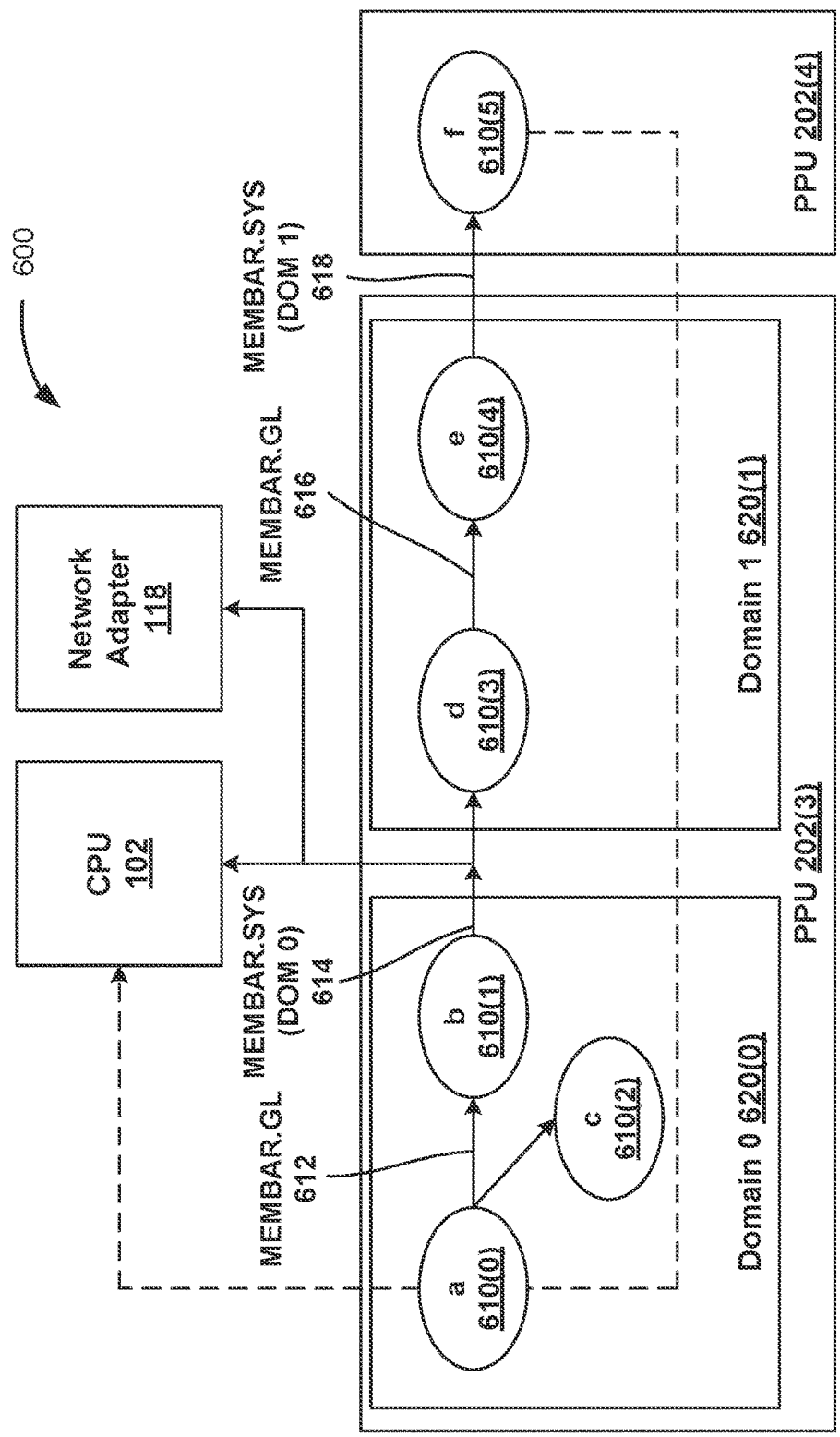
FIG. 6 is a block diagram of a node with multiple parallel processing subsystems executing kernels in multiple domains, according to various embodiments.

FIG. 6 is a block diagram of a node 600 with multiple parallel processing subsystems 112 executing kernels in multiple domains, according to various embodiments. As shown, the node 600 includes, without limitation, a CPU 102, a network adapter 118, and two PPUs 202(3)-202(4). Kernel a 610(0) executes and performs various memory references during execution. In order to communicate with kernel b 610(1) and/or kernel c 610(2), kernel a 610(0) executes a MEMBAR instruction. Because kernel a 610(0), kernel b 610(1) and/or kernel c 610(2) are all executing in domain 0 620(0) on the same PPU 202(3), kernel a 610(0) executes a MEMBAR.GL instruction 612. After the MEMBAR.GL instruction 612 completes, kernel a 610(0), kernel b 610(1), and kernel c 610(2) are synchronized at GPU scope and may exchange data. In order to communicate with kernel d 610(3), the CPU 102 and/or the network adapter 118, kernel b 610(1) executes a MEMBAR instruction. Even though kernel b 610(1) and kernel d 610(3) are both executing on PPU 202(3), kernel b 610(1) is executing in domain 0 620(0) while kernel d 610(3) is executing in domain 1 620(1). Because kernel b 610(1) and kernel d 610(3) are executing in different domains, kernel b 610(1) executes a MEMBAR.SYS instruction 614 to preserve transitivity across domains. After the MEMBAR.SYS instruction 614 completes, kernel b 610(1), kernel d 610(3), the CPU 102, and the network adapter 118 are synchronized at system scope and may exchange data. Due to transitivity, kernel a 610(0) is also synchronized to the CPU 102 and the network adapter 118 at system scope and may exchange data.

In order to communicate with kernel e 610(4), kernel d 610(3) executes a MEMBAR instruction. Because kernel d 610(3) and kernel e 610(4) are executing in the same domain on the same PPU 202(3), kernel d 610(3) executes a MEMBAR.GL instruction 616. After the MEMBAR.GL instruction 616 completes, kernel d 610(3) and kernel e 610(4) are synchronized at GPU scope and may exchange data. In order to communicate with kernel f 610(5), kernel e 610(4) executes a MEMBAR instruction. Because kernel f 610(5), executing on PPU 202(4), is remote to kernel e 610(4), kernel e 610(4) executes a MEMBAR.SYS instruction 618. After the MEMBAR.SYS instruction 618 completes, kernel e 610(4) and kernel f 610(5) are synchronized at system scope and may exchange data. Due to transitivity, kernel a 610(0) is also synchronized to kernel f 610(5) at system scope and may exchange data. In this manner, transitivity is preserved within a memory synchronization domain, between memory synchronization domains on the same PPU 202, and between kernels and domains executing on different PPUs.

Figure 7:
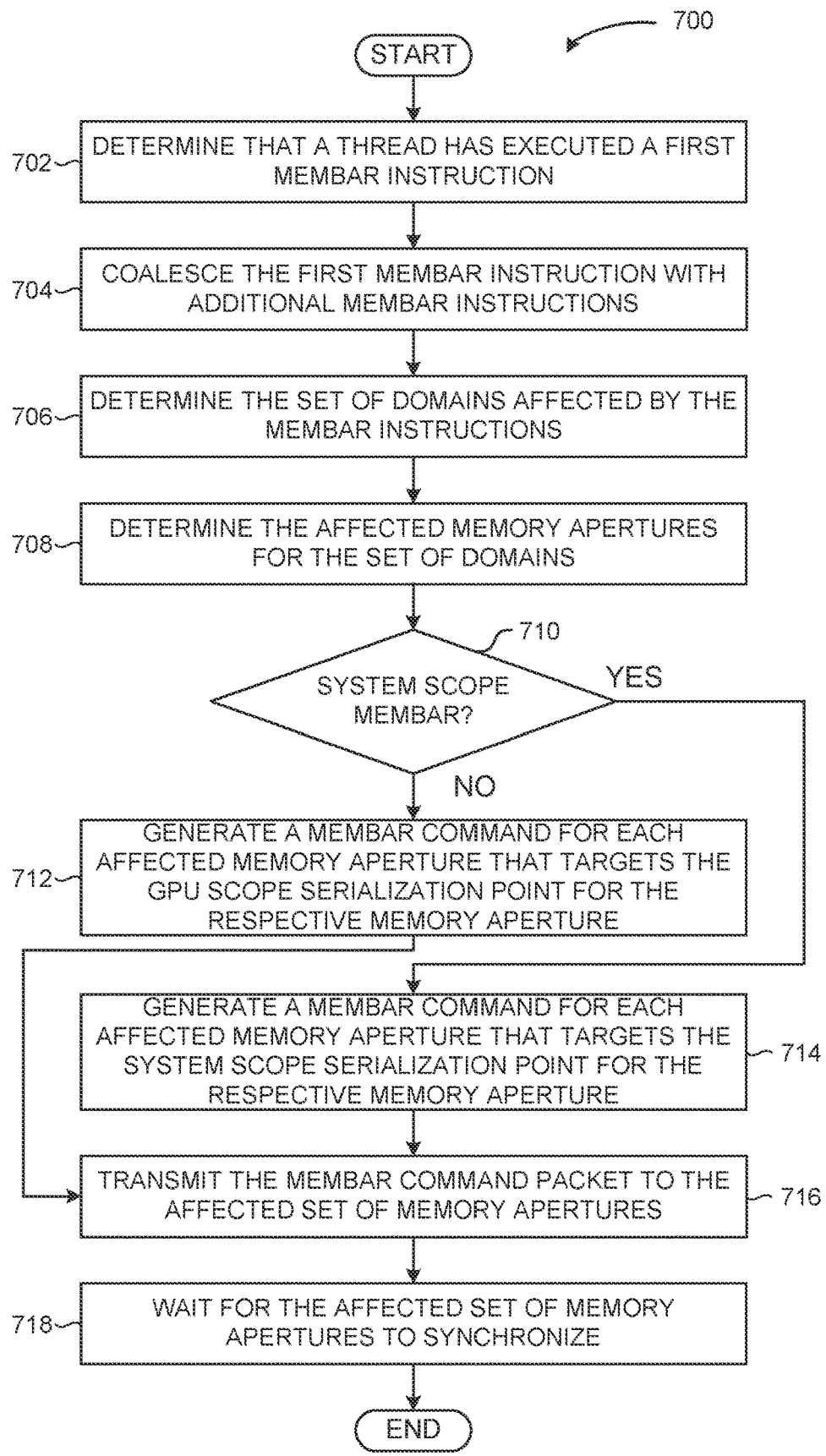
FIG. 7 is a flow diagram of method steps for synchronizing threads via the PPU 202 of FIG. 2, according to various embodiments.

FIG. 7 is a flow diagram of method steps for synchronizing threads via the PPU 202 of FIG. 2, according to various embodiments. Although the method steps are described in conjunction with the systems of FIGS. 1-6, persons of ordinary skill in the art will understand that any system configured to perform the method steps, in any order, is within the scope of the present disclosure.

As shown, a method 700 begins at step 702, where a memory management unit (MMU) 320 included in a parallel processing unit (PPU) 202 determines that a thread has executed a first MEMBAR instruction. Kernels executing within each domain execute MEMBAR.GL and MEMBAR.SYS instructions as needed to preserve transitivity between domains and between PPUs 202. When a thread executing on a kernel in a particular domain executes a MEMBAR instruction, the SM transmits the MEMBAR instruction, along with the domain ID, to the MMU 320.

At step 704, the MMU 320 coalesces or otherwise combines the first MEMBAR instruction with one or more additional MEMBAR instructions. The MMU 320 may generate a MEMBAR command for multiple domains. When a MEMBAR instruction is received, the load-store unit, texture unit 315, or other unit within the SM 310 waits for a duration of time to determine if one or more additional MEMBAR instructions are received. If the load-store unit, texture unit 315, or other unit within the SM 310 does not receive any other MEMBAR instructions within the duration of time, then the MEMBAR instruction for the domain is processed. If the load-store unit, texture unit 315, or other unit within the SM 310 receives one or more additional MEMBAR instructions within the duration of time, then the MMU 320 coalesces or otherwise combines the multiple MEMBAR instructions into a single MEMBAR command. Additionally or alternatively, the work distribution unit 207 issues a MEMBAR instruction and coalesces or otherwise combines the MEMBAR instruction with one or more additional MEMBAR instructions, as described herein. Additionally or alternatively, any other suitable component of the PPU 202 issues a MEMBAR instruction and coalesces or otherwise combines the MEMBAR instruction with one or more additional MEMBAR instructions, as described herein.

At step 706, the MMU 320 determines the set of domains affected by the MEMBAR instructions. The set of domains affected by the MEMBAR instructions include the domain specified by the first MEMBAR instruction of step 702 plus one or more domains specified by the additional MEMBAR instructions of step 704, if any.

At step 708, the MMU 320 determines the affected memory apertures for the affected domains. If the MMU 320 is processing a single MEMBAR instruction, then the MMU 320 accesses the corresponding tracker for that domain to determine the set of memory apertures accessed by that domain since the prior MEMBAR instruction was executed. If the MMU 320 is processing multiple MEMBAR instructions, then the MMU 320 accesses the corresponding trackers for the domains associated with the multiple MEMBAR commands to determine the set of memory apertures accessed by the domains.

At step 710, the MMU 320 determines whether the MEMBAR instruction is at system scope. If the MEMBAR instruction is not at system scope, then the MEMBAR instruction is at GPU scope and the method 700 proceeds to step 712, where the MMU 320 generates a MEMBAR command for each affected memory aperture that targets the GPU scope serialization point for the respective memory aperture. If the MMU 320 is processing a single MEMBAR instruction, then the MMU 320 generates a MEMBAR.GL command that identifies the domain ID and the set of memory apertures accessed by that domain. If no memory apertures have been accessed by the domain, then the MEMBAR.GL command completes. If the MMU 320 is processing multiple MEMBAR instructions, then the MMU 320 generates a MEMBAR.GL command that identifies the domain IDs and the set of memory apertures accessed by the domains. If no memory apertures have been accessed by any of the relevant domains, then the MEMBAR.GL command completes.

Returning to step 710, if the MEMBAR instruction is at system scope, then the method 700 proceeds to step 714, where the MMU 320 generates a MEMBAR command for each affected aperture that targets the system scope serialization point for the respective memory aperture. If the MMU 320 is processing a single MEMBAR instruction, then the MMU 320 generates a MEMBAR.SYS command that identifies the domain ID and the set of memory apertures accessed by that domain. If no memory apertures have been accessed by the domain, then the MEMBAR.SYS command completes. If the MMU 320 is processing multiple MEMBAR instructions, then the MMU 320 generates a MEMBAR.SYS command that identifies the domain IDs and the set of memory apertures accessed by the domains. If no memory apertures have been accessed by any of the relevant domains, then the MEMBAR.SYS command completes.

From either step 712 or step 714, the method 700 proceeds to step 716, where the MMU 320 transmits the MEMBAR command to each memory aperture accessed by the domain(s) associated with the MEMBAR command. At step 718, the MMU 320 waits for the affected set of memory apertures to synchronize. Each memory aperture that receives the MEMBAR command determines whether that memory aperture has any outstanding memory references. If the memory aperture does not have any outstanding memory references, then the memory aperture returns an acknowledgement to the MMU 320 that the MEMBAR command is complete for that memory aperture. If, on the other hand, the memory aperture does have one or more outstanding memory references, then the memory aperture waits until all outstanding memory references have reached a serialization point.

Once all outstanding memory references have reached appropriate serialization points, the memory aperture returns an acknowledgement to the MMU 320 that the MEMBAR command is complete for that memory aperture. After the MMU 320 receives an acknowledgement from all the relevant memory apertures, the MMU 320 clears the tracker for the relevant memory apertures for the domains associated with the MEMBAR command. In some embodiments, the MMU 320 continues processing subsequent memory store operations issued by other threads executing on the same SM 310 other than the SM(s) 310 that issued the MEMBAR instruction(s). In such embodiments, the MMU 320 clears the relevant trackers and clears the intermediate state while continuing to process subsequent memory store operations. In this fashion, the MEMBAR command flushes only the relevant memory apertures accessed by the relevant domains and does not flush memory apertures that have only been accessed by other domains. The method 700 then terminates.

In sum, various embodiments include PPUs in a parallel processing system that execute kernels in the context of a set of memory synchronization domains, where a kernel is a program executing on an SM by one or more threads, one or more warps, and/or one or more CTAs. Each domain does not represent a physical separation of a portion of the resources of a PPU. Rather, a memory synchronization domain represents a set of resources within a PPU that synchronize with one another, but do not necessarily need to synchronize with other resources within the PPU that are not in the memory synchronization domain. These memory synchronization domains within the PPU allow user level program code to specify to the PPU the memory references that are flushed for a particular memory synchronization domain when a kernel executes a MEMBAR.SYS instruction. When a particular kernel is launched in an SM, the kernel and the threads executing within the kernel are tagged with a particular domain identifier (ID).

When a thread executing within a kernel tagged as part of the memory synchronization domain with a domain ID of 3 executes a MEMBAR.SYS instruction, the PPU flushes memory references to system scope for only those kernels executing with a domain ID of 3. Memory references for kernels executing with other domain IDs, such as a domain ID of 2, are not flushed to system scope. As a result, the kernels executing with a domain ID of 3 are not slowed down by unnecessary flushes to system scope of memory references associated with kernels executing with other domain IDs.

To support these techniques, each SM tracks memory references on a per memory synchronization domain basis. For each memory synchronization domain, the SM tracks memory references to each external memory aperture. In that regard, each SM tracks memory references directed towards the system memory for subsequent access by one or more CPUs within the node. Further, each SM tracks memory references directed towards peer memory for subsequent access by one or more other PPUs within the node. In addition, each SM tracks memory references directed towards memory for network adapter to communicate other nodes. In some embodiments, each SM may additionally track memory references directed towards local memory, such as memory references directed towards the L2 cache and/or towards the DRAM via the memory interface. In some embodiments, MMUs track memory references rather than the SMs. Additionally or alternatively, both the SMs and the MMUs track memory references.

When one or more threads within a particular kernel execute a MEMBAR.GL instruction, the corresponding SM communicates the MEMBAR.GL instruction to the MMU along with the domain ID of the kernel and the list of memory apertures that the threads within that memory synchronization domain have referenced. The memory apertures include system memory associated with the CPUs, peer memory associated with other PPUs, peer memory associated with the network adapter, and local memory, such as the L2 cache and/or the DRAM. The memory apertures for only the affected domain are synchronized at GPU scope.

When one or more threads within a particular kernel execute a MEMBAR.SYS instruction, the corresponding SM communicates the MEMBAR.SYS instruction to the MMU along with the domain ID of the kernel and the list of memory apertures that the threads within that memory synchronization domain have referenced. When processing a MEMBAR.SYS instruction, if none of the threads in the affected domains have referenced any system memory aperture or peer memory aperture, then the MMU does not synchronize the system memory apertures or peer memory apertures at system scope. Likewise, if the threads in the affected domains have referenced only a subset of the memory apertures, then only the subset of domains is synchronized at the scope specified by the MEMBAR instruction.

At least one technical advantage of the disclosed techniques relative to the prior art is that, with the disclosed techniques, only the memory apertures referenced by threads in a particular domain are synchronized during the processing of MEMBAR instructions. Memory apertures referenced only by other domains are not synchronized. Therefore, the threads for the particular domain do not wait unnecessarily for synchronization of memory apertures that have been accessed only by other domains. As a result, MEMBAR instructions complete in a reduced amount of time relative to prior approaches. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for synchronizing threads executing in a processor, the method comprising:

determining that a first thread has executed a first memory barrier instruction, wherein the first thread is included in a first set of threads associated with a first domain representing a first set of resources included in the processor that synchronize with one another;

determining a set of memory apertures associated with the first domain that have been accessed by at least one thread included in the first set of threads;

generating a memory barrier command that:
  specifies references to the set of memory apertures associated with the first domain to flush in response to the memory barrier command, and
  excludes references to other memory apertures that are excluded from being flushed in response to the memory barrier command, wherein the other memory apertures are accessed by threads associated with a second domain representing a second set of resources included in the processor that synchronize with one another, and wherein the second set of resources is different from the first set of resources; and transmitting the memory barrier command to the set of memory apertures.

2. The computer-implemented method of claim 1, wherein the set of memory apertures includes a first memory aperture that is internal to the processor and excludes a second memory aperture that is external to the processor.

3. The computer-implemented method of claim 1, wherein the set of memory apertures includes a first memory aperture that is internal to the processor and a second memory aperture that is external to the processor.

4. The computer-implemented method of claim 1, wherein the set of memory apertures includes a first memory aperture that is external to the processor and a second memory aperture that is external to the processor and is exclusive of the first memory aperture.

5. The computer-implemented method of claim 1, wherein:
  the set of memory apertures includes a first subset of memory apertures that includes at least one of a first memory aperture that is internal to the processor or a second memory aperture that is external to the processor,
  the set of memory apertures further includes a second subset of memory apertures that includes at least one of a third memory aperture that is internal to the processor or a fourth memory aperture that is external to the processor, and
  the first subset of memory apertures is not identical to the second subset of memory apertures.

6. The computer-implemented method of claim 1, wherein the first memory barrier instruction includes a domain identifier associated with the first domain.

7. The computer-implemented method of claim 1, further comprising:
  combining the first memory barrier instruction with a second memory barrier instruction executed by a second thread included in a second set of threads associated with a third domain,
  wherein the set of memory apertures further includes memory apertures that have been accessed by at least one thread included in the second set of threads.

8. The computer-implemented method of claim 7, wherein the first memory barrier instruction includes a first domain identifier associated with the first domain, and the second memory barrier instruction includes a second domain identifier associated with the second domain.

9. The computer-implemented method of claim 1, further comprising determining that each memory reference associated with the set of memory apertures has reached a serialization point.

10. The computer-implemented method of claim 1, wherein the first domain is identified by task metadata associated with the first thread.

11. The computer-implemented method of claim 1, wherein the first domain and the second domain are included in a set of domains comprising four domains.

12. The computer-implemented method of claim 1, wherein a first memory aperture included in the set of memory apertures includes a synchronization point, and further comprising:
  determining that a memory reference executed by the first thread has reached the synchronization point; and
  indicating that memory barrier command has completed.

13. One or more non-transitory computer-readable media storing program instructions that, when executed by one or more processors, cause the one or more processors to perform steps of:
  determining that a first thread has executed a first memory barrier instruction, wherein the first thread is included in a first set of threads associated with a first domain representing a first set of resources included in a first processor of the one or more processors that synchronize with one another;
  determining a set of memory apertures associated with the first domain that have been accessed by at least one thread included in the first set of threads;
  generating a memory barrier command that:
    specifies references to the set of memory apertures associated with the first domain to flush in response to the memory barrier command, and
    excludes references to other memory apertures that are excluded from being flushed in response to the memory barrier command, wherein the other memory apertures are accessed by threads associated with a second domain representing a second set of resources included in the first processor that synchronize with one another, and wherein the second set of resources is different from the first set of resources; and
  transmitting the memory barrier command to the set of memory apertures.

14. The one or more non-transitory computer-readable media of claim 13, wherein the set of memory apertures includes a first memory aperture that is internal to the first processor and excludes a second memory aperture that is external to the first processor.

15. The one or more non-transitory computer-readable media of claim 13, wherein the set of memory apertures includes a first memory aperture that is internal to the first processor and a second memory aperture that is external to the first processor.

16. The one or more non-transitory computer-readable media of claim 13, wherein the first memory barrier instruction includes a domain identifier associated with the first domain.

17. The one or more non-transitory computer-readable media of claim 13, wherein the steps further comprise:
  combining the first memory barrier instruction with a second memory barrier instruction executed by a second thread included in a second set of threads associated with a third domain, wherein the set of memory apertures further includes memory apertures that have been accessed by at least one thread included in the second set of threads.

18. The one or more non-transitory computer-readable media of claim 17, wherein the first memory barrier instruction includes a first domain identifier associated with the first domain, and the second memory barrier instruction includes a second domain identifier associated with the second domain.

19. The one or more non-transitory computer-readable media of claim 13, wherein the steps further comprise determining that each memory reference associated with the set of memory apertures has reached a serialization point.

20. A system, comprising:
- a memory storing instructions; and
- a processor that is coupled to the memory and, when executing the instructions:
  - determines that a first thread has executed a first memory barrier instruction, wherein the first thread is included in a first set of threads associated with a first domain representing a first set of resources included in the processor that synchronize with one another;
  - determines a set of memory apertures associated with the first domain that have been accessed by at least one thread included in the first set of threads;
  - generates a memory barrier command that:
    - specifies references to the set of memory apertures associated with the first domain to flush in response to the memory barrier command, and
    - excludes references to other memory apertures that are excluded from being flushed in response to the memory barrier command, wherein the other memory apertures are accessed by threads associated with a second domain representing a second set of resources included in the processor that synchronize with one another, and wherein the second set of resources is different from the first set of resources; and
  - transmits the memory barrier command to the set of memory apertures.

* * * * *